United States Patent
Tooman et al.

(10) Patent No.: US 8,627,739 B2
(45) Date of Patent: Jan. 14, 2014

(54) DUAL FORK SINGLE SHIFT RAIL ASSEMBLY

(75) Inventors: Brian E. Tooman, White Lake, MI (US); Daryl A. Wilton, Macomb, MI (US); Patrick S. Portell, Clarkston, MI (US); Ryan M. Jenness, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 771 days.

(21) Appl. No.: 12/560,128

(22) Filed: Sep. 15, 2009

(65) Prior Publication Data
US 2011/0061487 A1    Mar. 17, 2011

(51) Int. Cl.
*B60K 20/00*    (2006.01)
*F16H 59/04*    (2006.01)

(52) U.S. Cl.
USPC ..................................................... 74/473.36

(58) Field of Classification Search
USPC ......... 74/335, 473.1, 473.21, 473.24, 473.36, 74/473.37
See application file for complete search history.

(56) References Cited

U.S. PATENT DOCUMENTS

| | | | | |
|---|---|---|---|---|
| 4,458,551 A | * | 7/1984 | Winter-Peter | 74/473.21 |
| 4,529,080 A | * | 7/1985 | Dolan | 192/109 A |
| 4,619,153 A | * | 10/1986 | Lasoen | 74/473.11 |
| 4,621,537 A | * | 11/1986 | Piazza et al. | 74/473.24 |
| 5,893,293 A | * | 4/1999 | Earp | 74/335 |
| 6,026,702 A | * | 2/2000 | Dreier et al. | 74/473.21 |
| 6,070,486 A | * | 6/2000 | Toyota | 74/473.19 |
| 6,230,577 B1 | * | 5/2001 | Showalter et al. | 74/337.5 |
| 6,467,598 B2 | * | 10/2002 | Jackson et al. | 192/53.34 |
| 6,668,676 B2 | * | 12/2003 | Koyama et al. | 74/473.28 |
| 6,725,738 B2 | * | 4/2004 | Okubo et al. | 74/473.22 |
| 6,935,204 B2 | * | 8/2005 | Walker et al. | 74/335 |
| 7,219,571 B2 | * | 5/2007 | McCrary | 74/335 |
| 7,350,432 B2 | * | 4/2008 | Somschor et al. | 74/335 |
| 7,426,882 B2 | * | 9/2008 | Murai et al. | 74/473.36 |
| 7,845,247 B2 | * | 12/2010 | Olds et al. | 74/333 |
| 2004/0069082 A1 | | 4/2004 | Koenig et al. | |
| 2005/0166698 A1 | * | 8/2005 | Fanning et al. | 74/473.25 |
| 2007/0151384 A1 | * | 7/2007 | Humphrey et al. | 74/473.21 |
| 2008/0295634 A1 | * | 12/2008 | Olds et al. | 74/473.37 |
| 2011/0061487 A1 | * | 3/2011 | Tooman et al. | 74/473.36 |

FOREIGN PATENT DOCUMENTS

JP    2007064414 A    3/2007

* cited by examiner

*Primary Examiner* — Troy Chambers
*Assistant Examiner* — Alexander Vu

(57) ABSTRACT

A multiple shift fork, single shift rail assembly reduces weight and complexity in manual and dual clutch transmissions. In a first embodiment, a stationary shift rail includes pluralities of detenting recesses and cooperating detent assemblies are mounted on the shift forks. Associated actuators translate the shift forks and synchronizer clutches. In a second embodiment, the detenting recesses reside on the outside surface of the shift forks and the detent assemblies are mounted in the transmission housing. In a third embodiment, one shift fork is slidably mounted on the shift rail and includes an external detent assembly. The shift rail itself translates and includes detenting recesses and a second shift fork connected thereto.

16 Claims, 6 Drawing Sheets

DUAL FORK SINGLE SHIFT RAIL ASSEMBLY

FIELD

The present disclosure relates to shift assemblies for vehicular transmissions and more particularly to a shift assembly for manual or dual clutch vehicular transmissions having at least two shift forks disposed on a single shift rail.

BACKGROUND

The statements in this section merely provide background information related to the present disclosure and may or may not constitute prior art.

Gear changes in manual and dual clutch transmissions are generally achieved by a synchronizer clutch which is splined to and which rotates with an associated shaft. Adjacent the synchronizer clutch is one or a pair of gears which provide distinct gear or speed ratios. Axial motion of the synchronizer clutch first synchronizes and then couples the gear to the shaft and drive torque is then applied to the engaged gear or shaft.

Axial motion of the synchronizer clutch is commanded by a shift fork which engages a groove in the periphery of the clutch and which is slidably disposed on a shift rail. A linear output of a two or three position actuator may be directly connected to the shift fork or the shift fork may be secured to the shift rail, in which case the actuator is connected to and translates the shift rail.

Especially in the latter configuration, each shift fork requires a dedicated shift rail. Thus, in a five speed transmission which encompasses six gears with reverse, it is necessary to have at least three shift rails, actuators and shift forks. In a six or seven speed transmission (which encompasses seven or eight speeds when reverse is included), it is necessary to have at least four shift rails, actuators and shift forks.

Because each shift rail occupies space in the transmission and requires mounting bosses and/or linear bearings, they add to the complexity and cost of a transmission. Reducing their number is thus desirable.

SUMMARY

The present invention provides several embodiments of a multiple shift fork, single shift rail assembly. In a first embodiment, a stationary shift rail includes pluralities of detenting recesses and cooperating detent assemblies are mounted on the shift forks. Associated actuators translate the shift forks and synchronizer clutches. In a second embodiment, the detenting recesses reside on the outside surface of the shift forks and the detent assemblies are mounted in the transmission housing. In a third embodiment, one shift fork is slidably mounted on the shift rail and includes an external detent assembly. The shift rail itself translates and includes detenting recesses and a second shift fork connected thereto. In every embodiment, more than two shift forks may be associated with a single shift rail if desired.

Thus it is an object of the present invention to provide a single shift rail for a transmission having two shift forks disposed thereon.

It is a further object of the present invention to provide a single shift rail for a manual or a dual clutch transmission having two shift forks disposed thereon.

It is a still further object of the present invention to provide a stationary shift rail having detenting recesses and shift forks carrying detent assemblies.

It is a still further object of the present invention to provide a stationary shift rail which receives two shift fork having detenting recesses on their exterior surfaces.

It is a still further object of the present invention to provide an axially translating shift rail having detenting recesses and a first shift fork secured thereto and a second shift fork slidable thereon with detenting recesses on its exterior surface.

It is a still further object of the present invention to provide a single shift rail having more than two shift forks disposed thereon.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
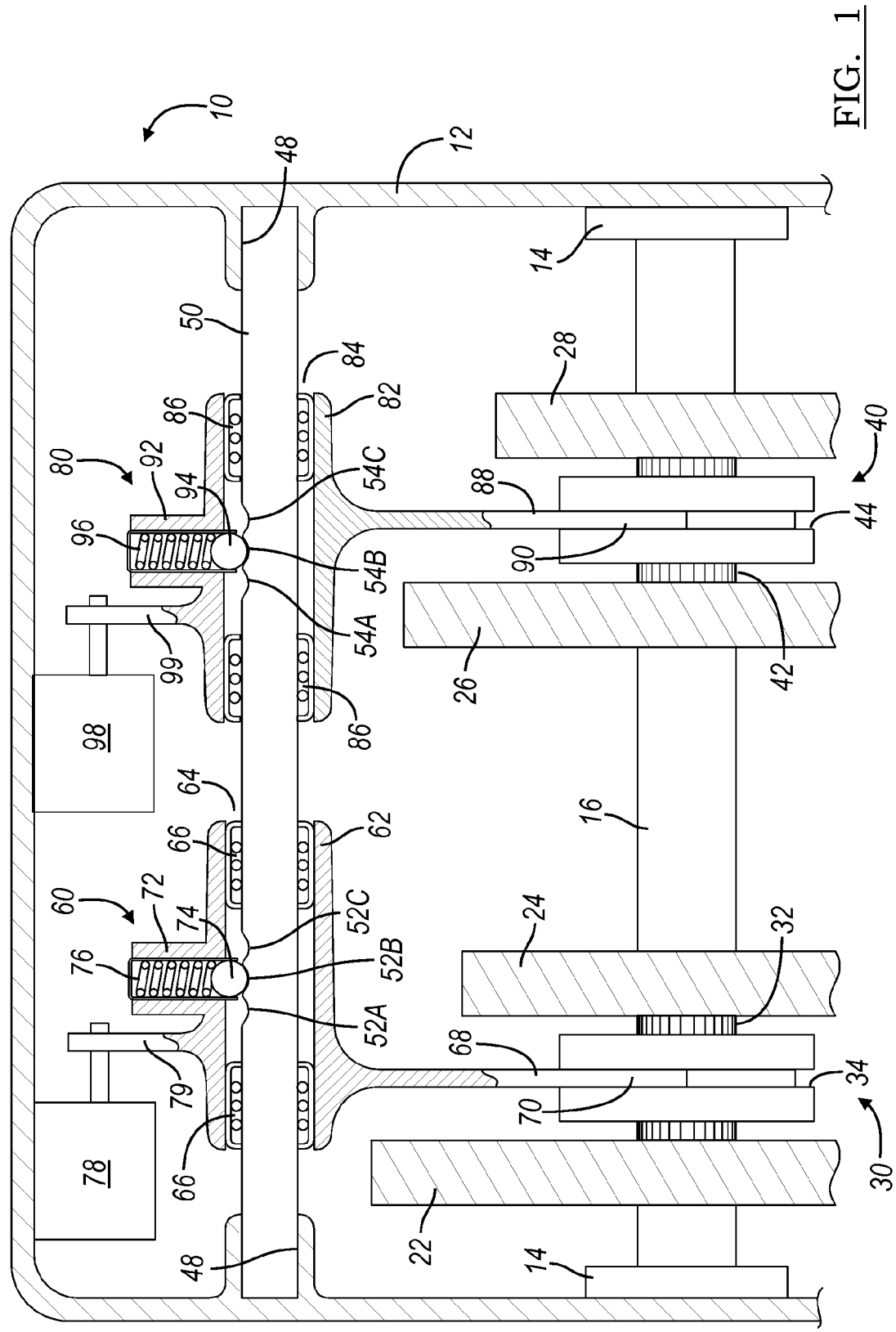
FIG. 1 is diagrammatic, side elevational view in partial section of a portion of a transmission incorporating a first embodiment of a single shift rail assembly according to the present invention.

With reference now to FIG. 1, a portion of a vehicular transmission is illustrated and generally designated by the reference number 10. The transmission 10 may be either a manual transmission, a dual clutch transmission (DCT) or other configuration wherein synchronizers and face or dog clutches are utilized to connect a plurality of gears to one or more associated shafts. The transmission 10 includes an exterior housing 12 which typically includes openings, counterbores, shoulders, flanges and the like which locate, receive and retain various components of the transmission 10.

Supported for rotation within the housing 12 on, for example pairs of ball or tapered roller bearing assemblies 14 are various shafts, one of which, a countershaft or layshaft 16, is illustrated. The countershaft 16 freely rotatably receives a plurality of spur or preferably helical gears 22, 24, 26 and 28. The gears 22, 24, 26 and 28 are paired and in constant mesh with adjacent gears (not illustrated) on one or more adjacent parallel shafts and together these pairs of gears provide a selection of forward (and reverse) speeds or gear ratios.

Between the adjacent gears 22 and 24 is disposed a first synchronizer clutch 30. The first synchronizer clutch 30 includes both a pair of synchronizer assemblies and a pair of face or dog clutches. The first synchronizer clutch 30 is rotationally connected to the countershaft 16 by a first interengaging male and female spline set 32 but is free to axially translate therealong. When the first synchronizer clutch 30 is translated to the left or right on the countershaft 16, it exclusively first synchronizes and then positively couples the gear 22 or the gear 24 to the countershaft 16. The first synchronizer clutch 30 includes a circumferential channel or groove 34.

Between the adjacent gears 26 and 28 is disposed a second synchronizer clutch 40. The second synchronizer clutch 40 also includes both a pair of synchronizer assemblies and a pair of face or dog clutches. The second synchronizer clutch 40 is rotationally connected to the countershaft 16 by a second interengaging male and female spline set 42 but is free to axially translate therealong. When the second synchronizer clutch 40 is translated to the left or right on the countershaft 16, it exclusively first synchronizes and then positively couples the gear 26 or the gear 28 to the countershaft 16. The first synchronizer clutch 30 also includes a circumferential channel or groove 44.

Figure 2:
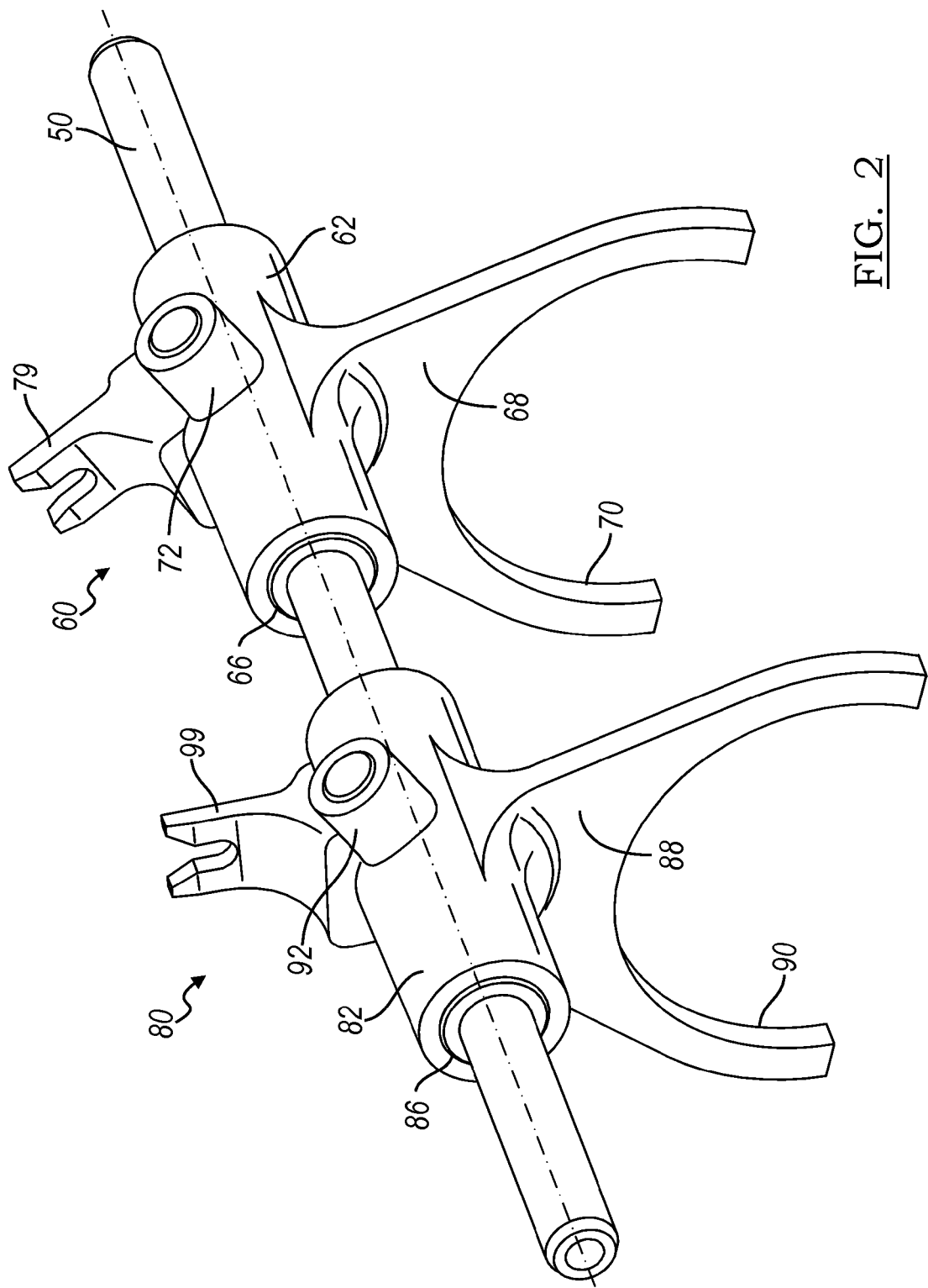
FIG. 2 is a perspective view of a first embodiment of a single shift rail assembly according to the present invention.

Referring now to FIGS. 1 and 2, secured within suitable blind openings or bores 48 in the housing 12 is a stationary shift rail 50. The shift rail 50 is preferably a round shaft and may be hollow to reduce its weight. The stationary shift rail 50 is spaced from and parallel to the countershaft 16. The stationary shift rail 50 defines a first set of detenting recesses 52A, 52B and 52C and a second set of detenting recesses 54A, 54B and 54C which are spaced from the first set of recesses 52A, 52B and 52C.

Received for bi-directional axial translation on the stationary shift rail 50 are a first shift fork assembly 60 and a second shift fork assembly 80. The first shift fork assembly 60 includes a first cylindrical or tubular body 62 defining a through passageway 64 that receives the stationary shift rail 50. A first pair of linear ball bearing assemblies 66 disposed within the passageway 64 and generally proximate the ends of the tubular body 62 reduce friction and stabilize the first shift fork assembly 60 on the stationary shift rail 50. A first shift fork 68 extends radially from the cylindrical body 62 and includes a first yoke 70 which engages the circumferential channel or groove 34 in the first synchronizer clutch 30.

The first cylindrical body 62 also includes a first radially oriented housing 72 which receives a first detent ball 74 which is biased toward the stationary shift rail 50 and the first set of detenting recesses 52A, 52B and 52C by a first compression spring 76. The output of a first bi-directionally translating, three position electric, pneumatic or hydraulic actuator or operator 78 is coupled to a first arm or extension 79 of the first cylindrical body 62 of the first shift fork assembly 60 and translates from a center, neutral position illustrated in FIG. 1 to a first active position to the left to cause synchronization and engagement of the first gear 22 or to a second active position the right to cause synchronization and engagement of the second gear 24.

When the first shift fork assembly 60 is in the left, first active position, the detent ball 74 is in the first detenting recess 52A and cooperation between the first recess 52A and the detent ball 74 resists motion of the first shift fork assembly 60. When the first shift fork assembly 60 is in the center, neutral position, the detent ball 74 is in the second detenting recess 52B and cooperation between the second recess 52B and the detent ball 74 again resists motion of the first shift fork assembly 60. When the first shift fork assembly 60 is in the right, second active position, the detent ball 74 is in the third detenting recess 52C and cooperation between the third recess 52C and the detent ball 74 once again resists motion of the first shift fork assembly 60.

The second shift fork assembly 80 also includes a second cylindrical or tubular body 82 defining a through passageway 84 that receives the stationary shift rail 50. A second pair of linear ball bearing assemblies 86 disposed generally proximate the ends of the second tubular body 82 reduce friction and stabilize the second shift fork assembly 80 on the stationary shift rail 50. A second shift fork 88 extends radially from the second cylindrical body 82 and includes a second yoke 90 which engages the circumferential channel or groove 34 in the second synchronizer clutch 40.

The second cylindrical body 82 also includes a radially oriented second housing 92 which receives a second detent ball 94 which is biased toward the stationary shift rail 50 and the second set of detenting recesses 54A, 54B and 54C by a second compression spring 96. The output of a second bi-directionally translating, three position electric, pneumatic or hydraulic actuator or operator 98 is coupled by a second arm or extension 99 to the second cylindrical body 82 of the second shift fork assembly 80 and translates from a center, neutral position illustrated in FIG. 1 to a first active position to the left to cause synchronization and engagement of the third gear 26 or to a second active position the right to cause synchronization and engagement of the fourth gear 28.

When the second shift fork assembly 80 is in the left, first active position, the second detent ball 94 is in the first detenting recess 54A and cooperation between the first recess 54A and the detent ball 94 resists motion of the second shift fork assembly 80. When the second shift fork assembly 80 is in the center, neutral position, the second detent ball 94 is in the second detenting recess 54B and cooperation between the second recess 54B and the detent ball 94 again resists motion of the second shift fork assembly 80. When the second shift fork assembly 80 is in the right, second active position, the second detent ball 94 is in the third detenting recess 54C and cooperation between the third recess 54C and the detent ball 94 once again resists motion of the second shift fork assembly 80.

Figure 3:
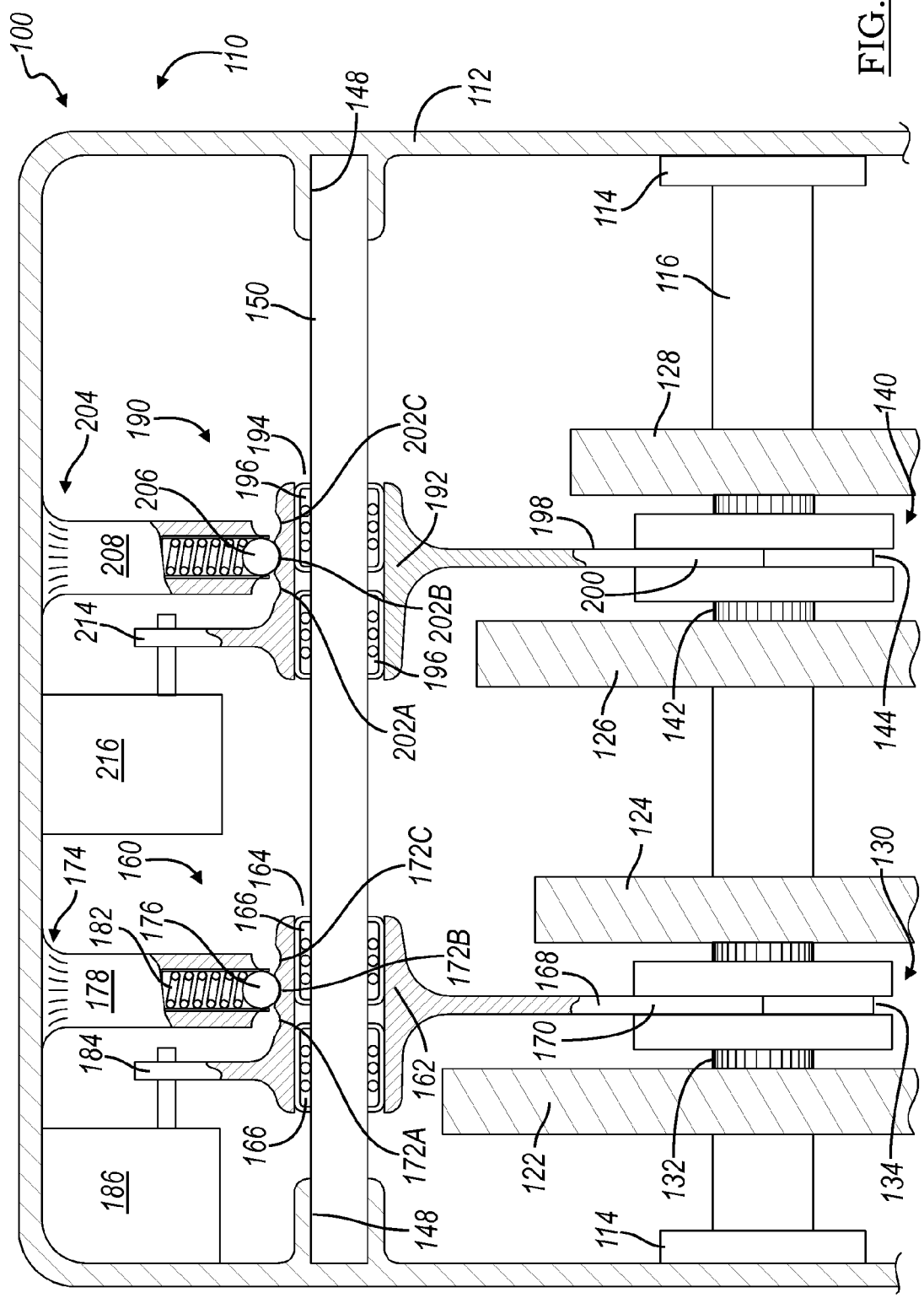
FIG. 3 is diagrammatic, side elevational view in partial section of a portion of a transmission incorporating a second embodiment of a single shift rail assembly according to the present invention.
Figure 4:
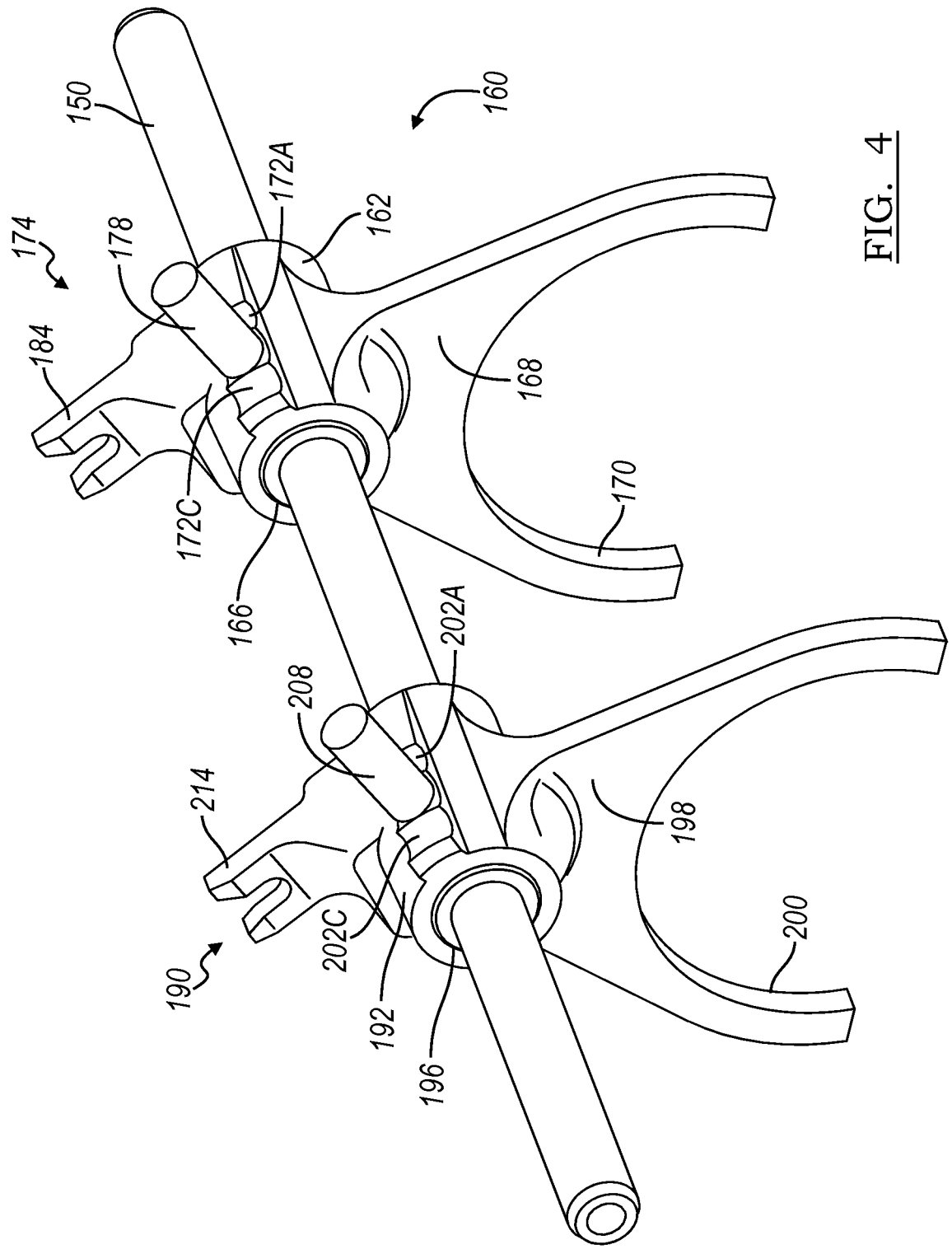
FIG. 4 is a perspective view of a second embodiment of a single shift rail assembly according to the present invention.

Referring now to FIGS. 3 and 4, a second embodiment of a single shift rail assembly according to the present invention is illustrated and generally designated by the reference number 100. FIG. 3 includes a portion of a vehicular transmission 110. As above, the transmission 110 may be either a manual transmission, a dual clutch transmission (DCT) or other configuration wherein synchronizers and face or dog clutches are utilized to connect a plurality of gears to one or more associated shafts. The transmission 110 includes an exterior housing 112 which receives and supports, among other components, pairs of ball or tapered roller bearing assemblies 114 which, in turn, rotatably support a countershaft or layshaft 116. The countershaft 116 freely rotatably receives a plurality of spur or preferably helical gears 122, 124, 126 and 128. The gears 122, 124, 126 and 128 are paired and in constant mesh with adjacent gears (not illustrated) on one or more adjacent parallel shafts and together these pairs of gears provide a selection of forward (and reverse) speeds or gear ratios.

Between the adjacent gears 122 and 124 is disposed a first synchronizer clutch 130. The first synchronizer clutch 130 includes both a pair of synchronizer assemblies and a pair of face or dog clutches. The first synchronizer clutch 130 is rotationally connected to the countershaft 116 by a first interengaging male and female spline set 132 but is free to axially translate therealong. When the first synchronizer clutch 130 is translated to the left or right on the countershaft 116, it exclusively first synchronizes and then positively couples the gear 122 or the gear 124 to the countershaft 116. The first synchronizer clutch 130 includes a circumferential channel or groove 134.

Between the adjacent gears 126 and 128 is disposed a second synchronizer clutch 140. The second synchronizer clutch 140 also includes both a pair of synchronizer assemblies and a pair of face or dog clutches. The second synchronizer clutch 140 is rotationally connected to the countershaft 116 by a second interengaging male and female spline set 142 but is free to axially translate therealong. When the second synchronizer clutch 140 is translated to the left or right on the countershaft 116, it exclusively first synchronizes and then positively couples the gear 126 or the gear 128 to the countershaft 116. The second synchronizer clutch 140 also includes a circumferential channel or groove 144.

Secured within suitable blind openings or bores 148 in the housing 112 is a stationary shift rail 150. The stationary shift rail 150 is spaced from and parallel to the countershaft 116. Disposed in general radial alignment with the first synchronizer clutch 130 for bi-directional translation on the stationary shift rail 150 is a first shift fork assembly 160 and in general radial alignment with the second synchronizer clutch 140 for bi-directional translation on the stationary shift rail 150 is a second shift fork assembly 190.

The first shift fork assembly 160 includes a first, relatively short cylindrical or tubular body 162 defining a through passageway 164 that receives the stationary shift rail 150. A first pair of linear ball bearing assemblies 166 disposed within the passageway 164 generally occupy the length of the tubular body 162, reduce friction and stabilize the first shift fork assembly 160 on the stationary shift rail 150. A first shift fork 168 extends radially from the cylindrical body 162 and includes a first yoke 170 which engages the circumferential channel or groove 134 in the first synchronizer clutch 130.

The first cylindrical body 162 also includes a first set of detenting recesses 172A, 172B and 172C. The first set of detenting recesses 172A, 172B and 172C are circumferentially and radially aligned with a first detenting assembly 174 which includes a detent ball 176 received within a cylindrical housing 178 which extends from and is secured to the housing 112. A compression spring 182 biases the detent ball 176 toward the recesses 172A, 172B and 172C. The cylindrical or tubular body 162 includes an arm or extension 184 that is coupled to the output of a first bi-directionally translating, three position electric, pneumatic or hydraulic actuator or operator 186. The output of the actuator or operator 186 translates from a center, neutral position illustrated in FIG. 3 to a first active position to the left to cause synchronization and engagement of the first gear 122 or to a second active position the right to cause synchronization and engagement of the second gear 124.

When the first shift fork assembly 160 is in the left, first active position, the detent ball 176 is in the third detenting recess 172C and the first detenting assembly 174 resists motion of the first shift fork assembly 160. When the first shift fork assembly 160 is in the center, neutral position, the detent ball 176 is in the second detenting recess 172B and the first detenting assembly 174 again resists motion of the first shift fork assembly 160. When the first shift fork assembly 160 is in the right, second active position, the detent ball 176 is in the first detenting recess 172A and the first detenting assembly 174 once again resists motion of the first shift fork assembly 160.

The second shift fork assembly 190 includes a second, relatively short cylindrical or tubular body 192 defining a through passageway 194 that receives the stationary shift rail 150. A second pair of linear ball bearing assemblies 196 disposed within the passageway 194 generally occupy the length of the tubular body 192, reduce friction and stabilize the second shift fork assembly 190 on the stationary shift rail 150. A second shift fork 198 extends radially from the second cylindrical body 192 and includes a second yoke 200 which engages the circumferential channel or groove 144 in the second synchronizer clutch 140.

The second cylindrical body 192 also includes a second set of detenting recesses 202A, 202B and 202C. The second set of detenting recesses 202A, 202B and 202C are circumferentially and radially aligned with a second detenting assembly 204 which includes a detent ball 206 received within a cylindrical housing 208 which extends from and is secured to the housing 112. A second compression spring 212 biases the detent ball 206 toward the second set of recesses 202A, 202B and 202C. The cylindrical or tubular body 192 includes an arm or extension 214 that is coupled to the output of a second bi-directionally translating, three position electric, pneumatic or hydraulic actuator or operator 216. The output of the actuator or operator 216 translates from a center, neutral position illustrated in FIG. 3 to a first active position to the left to cause synchronization and engagement of the third gear 126 or to a second active position the right to cause synchronization and engagement of the fourth gear 128.

When the second shift fork assembly 190 is in the left, first active position, the detent ball 206 is in the third detenting recess 202C and the second detenting assembly 204 resists motion of the second shift fork assembly 190. When the second shift fork assembly 190 is in the center, neutral position, the detent ball 206 is in the second detenting recess 202B and the second detenting assembly 204 again resists motion of the second shift fork assembly 190. When the second shift fork assembly 190 is in the right, second active position, the detent ball 206 is in the first detenting recess 202A and the second detenting assembly 204 once again resists motion of the second shift fork assembly 190.

Figure 5:
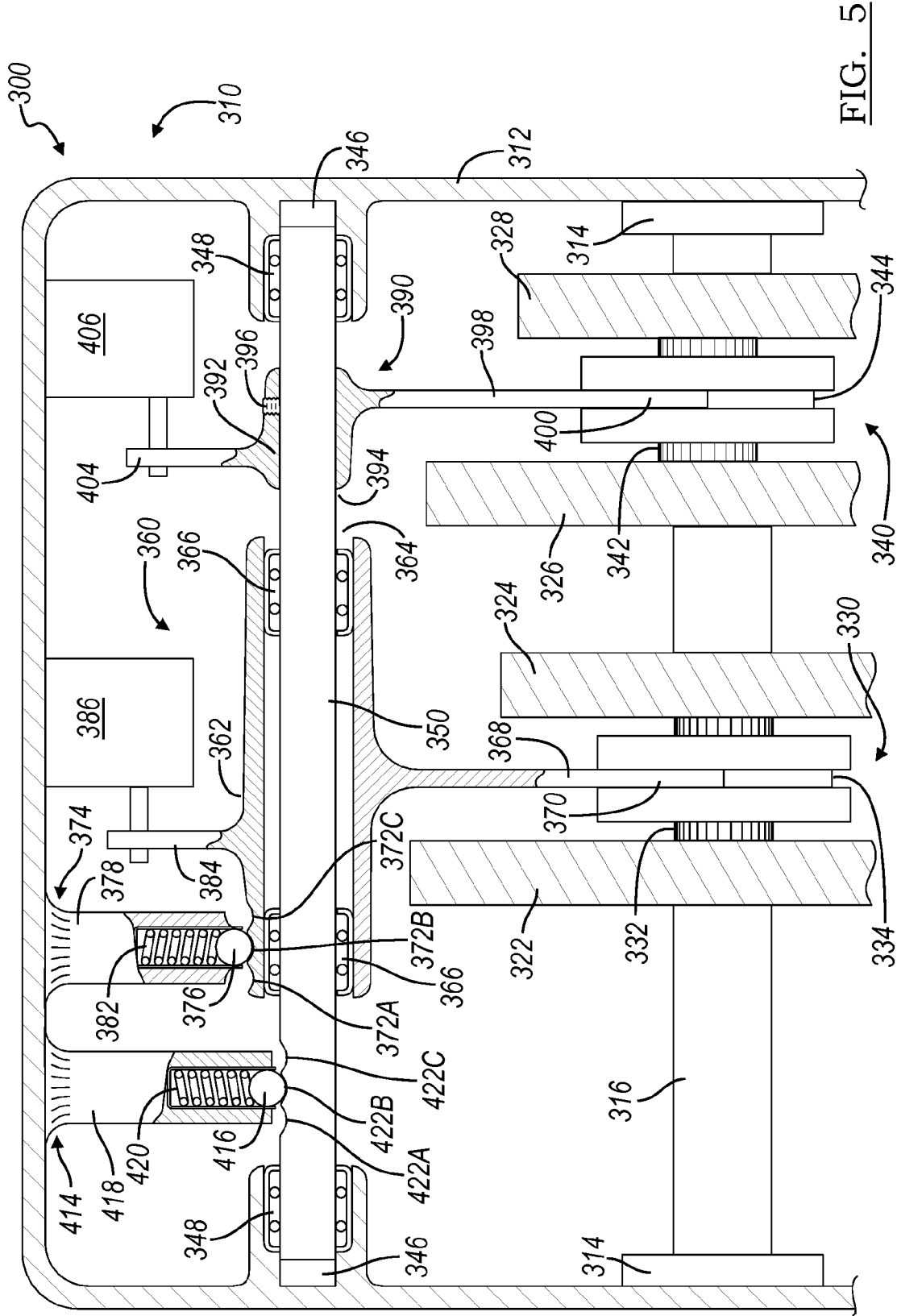
FIG. 5 is diagrammatic, side elevational view in partial section of a portion of a transmission incorporating a third embodiment of a single shift rail assembly according to the present invention.
Figure 6:
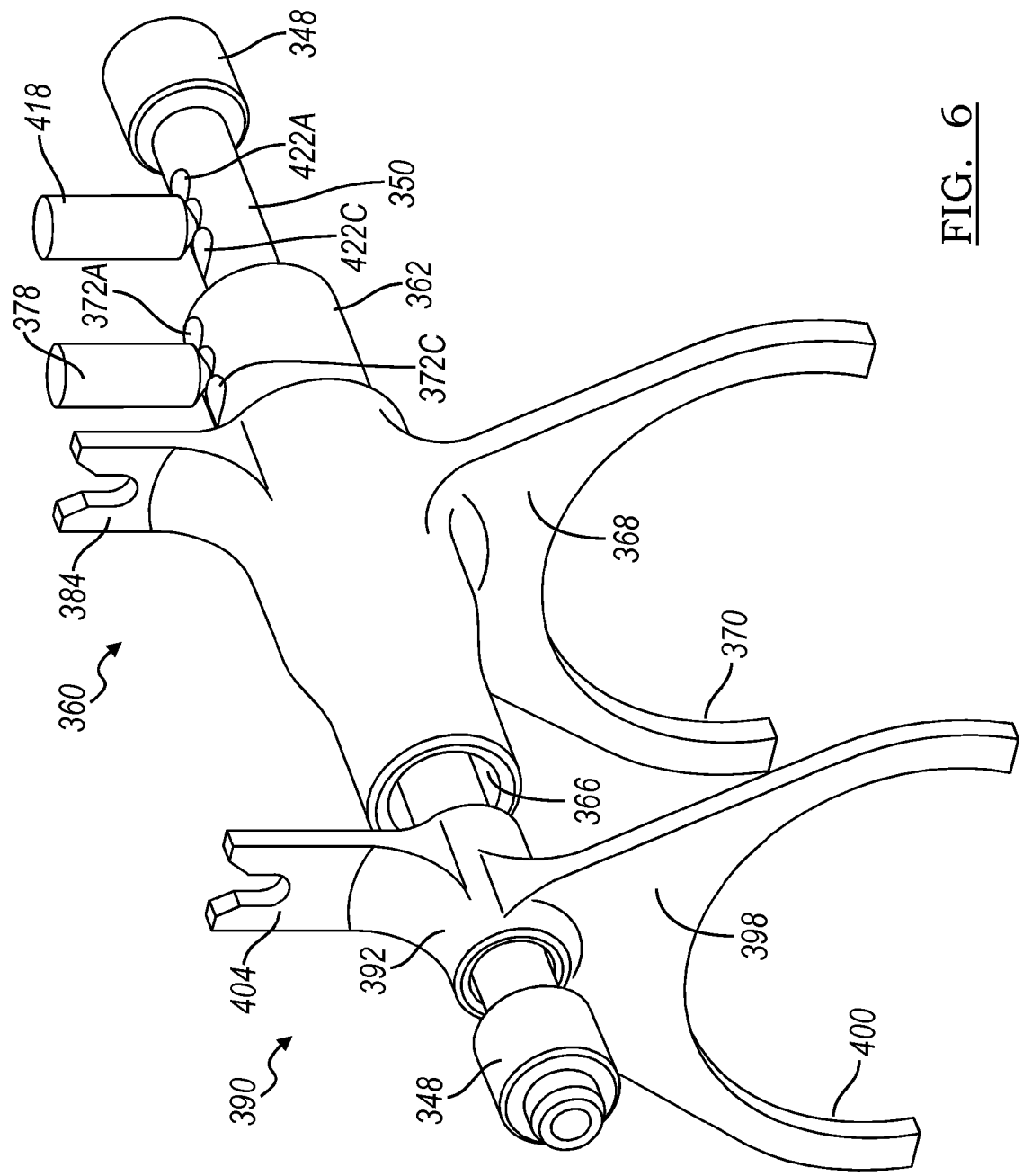
FIG. 6 is a perspective view of a third embodiment of a single shift rail assembly according to the present invention

Referring now to FIGS. 5 and 6, a third embodiment of a single shift rail assembly according to the present invention is illustrated and generally designated by the reference number 300. FIG. 5 includes a portion of a vehicular transmission 310. Once again, the transmission 310 may be either a manual transmission, a dual clutch transmission (DCT) or other configuration wherein synchronizers and face or dog clutches are utilized to connect a plurality of gears to one or more associated shafts. The transmission 310 includes an exterior housing 312 which receives and supports, among other components, pairs of ball or tapered roller bearing assemblies 314 which, in turn, rotatably support a countershaft or layshaft 316. The countershaft 316 freely rotatably receives a plurality of spur or preferably helical gears 322, 324, 326 and 328. The gears 322, 324, 326 and 328 are paired and in constant mesh with adjacent gears (not illustrated) on one or more adjacent parallel shafts and together these pairs of gears provide a selection of forward (and reverse) speeds or gear ratios.

Between the adjacent gears 322 and 324 is disposed a first synchronizer clutch 330. The first synchronizer clutch 330 includes both a pair of synchronizer assemblies and a pair of face or dog clutches. The first synchronizer clutch 330 is rotationally connected to the countershaft 316 by a first interengaging male and female spline set 332 but is free to axially translate therealong. When the first synchronizer clutch 330 is translated to the left or right on the countershaft 316, it exclusively first synchronizes and then positively couples the gear 322 or the gear 324 to the countershaft 316. The first synchronizer clutch 330 includes a circumferential channel or groove 334.

Between the adjacent gears 326 and 328 is disposed a second synchronizer clutch 340. The second synchronizer clutch 340 also includes both a pair of synchronizer assemblies and a pair of face or dog clutches. The second synchronizer clutch 340 is rotationally connected to the countershaft 316 by a second interengaging male and female spline set 342 but is free to axially translate therealong. When the second synchronizer clutch 340 is translated to the left or right on the countershaft 316, it exclusively first synchronizes and then positively couples the gear 326 or the gear 328 to the countershaft 316. The second synchronizer clutch 340 also includes a circumferential channel or groove 344.

Secured within an aligned, opposed pair of mounting openings or bores 346 in the housing 312 are a respective pair of linear ball bearing assemblies 348 which slidably and rotatably receive a single shift rail 350. Axial translation of the single shift rail 350 is, however, limited by the adjacent walls of the housing 312 and rotation is inhibited by components attached to the shift rail 350. The shift rail 350 is spaced from and parallel to the countershaft 316. Disposed in general radial alignment with the first synchronizer clutch 330 for bi-directional translation on the single shift rail 350 is a first shift fork assembly 360 and in general radial alignment with the second synchronizer clutch 340 for bi-directional translation with the single shift rail 350 is a second shift fork assembly 390.

The first shift fork assembly 360 includes a first, relatively long cylindrical or tubular body 362 defining a through passageway 364 that receives the single shift rail 350. A pair of linear ball bearing assemblies 366 disposed proximate the ends of the passageway 364 reduce friction and stabilize the first shift fork assembly 360 on the stationary shift rail 350. A first shift fork 368 extends radially from the cylindrical body 362 and includes a first yoke 370 which engages the circumferential channel or groove 334 in the first synchronizer clutch 330.

The first cylindrical body 362 also includes a first set of detenting recesses 372A, 372B and 372C. The first set of detenting recesses 372A, 372B and 372C are circumferentially and radially aligned with a first detenting assembly 374 which includes a detent ball 376 received within a cylindrical housing 378 which extends from and is secured to the housing 312. A compression spring 382 biases the detent ball 376 toward the recesses 372A, 372B and 372C. The cylindrical or tubular body 362 includes an arm or extension 384 that is coupled to the output of a first bi-directionally translating, three position electric, pneumatic or hydraulic actuator or operator 386. The output of the first actuator or operator 386 translates the first shift fork assembly 360 from a center, neutral position illustrated in FIG. 5 to a first active position to the left to cause synchronization and engagement of the first gear 322 or to a second active position the right to cause synchronization and engagement of the second gear 324.

When the first shift fork assembly 360 is in the left, first active position, the detent ball 376 is in the third detenting recess 372C and the first detenting assembly 374 resists motion of the first shift fork assembly 360. When the first shift fork assembly 360 is in the center, neutral position, the detent ball 376 is in the second detenting recess 372B and the first detenting assembly 374 again resists motion of the first shift fork assembly 360. When the first shift fork assembly 360 is in the right, second active position, the detent ball 376 is in the first detenting recess 372A and the first detenting assembly 374 once again resists motion of the first shift fork assembly 360.

The second shift fork assembly 390 includes a second, relatively short cylindrical or tubular body 392 defining a through passageway 394 that receives the single shift rail 350. The second cylindrical or tubular body 392 is secured to the single shift rail 350 by any suitable fastener such as a set screw 396, a taper pin or an interference fit. A second shift fork 398 extends radially from the second cylindrical body 392 and includes a second yoke 400 which engages the circumferential channel or groove 344 in the second synchronizer clutch 340. The second cylindrical or tubular body 392 also includes an arm or extension 404 that is coupled to the output of a second bi-directionally translating, three position electric, pneumatic or hydraulic actuator or operator 406. The output of the second actuator or operator 406 translates the second shift fork 398 from a center, neutral position illustrated in FIG. 5 to a first active position to the left to cause synchronization and engagement of the third gear 326 or to a second active position the right to cause synchronization and engagement of the fourth gear 328.

Disposed adjacent the first detenting assembly 374 is a second detenting assembly 414. The second detenting assembly 414 includes a second detent ball 416 received within a cylindrical housing 418 which extends from and is secured to the housing 312. The cylindrical housing 418 is aligned with the single shift rail 350. A compression spring 420 biases the detent ball 416 toward a plurality of detenting recesses 422A, 422B and 422C in the single shift rail 350.

When the second shift fork assembly 390 is in the left, first active position, the second detent ball 416 is in the third detenting recess 422C and the second detenting assembly 414 resists motion of the single shift rail 350 and the second shift fork assembly 390. When the second shift fork assembly 390 is in the center, neutral position, the detent ball 416 is in the second detenting recess 422B and the second detenting assembly 414 again resists motion of the shift rail 350 and the second shift fork assembly 390. When the second shift fork assembly 390 is in the right, second active position, the detent ball 416 is in the first detenting recess 422A and the second detenting assembly 414 once again resists motion of the shift rail 350 and the second shift fork assembly 390.

It will be appreciated that, first of all, the relatively long and the relatively short shift fork bodies, e.g. 362 and 162, of the various embodiments may be arranged and exchanged on the single shift rails 50, 150 and 350 as desired and, second of all, use of the relatively short shift fork bodies may readily permit the disposition of three shift fork bodies on either the stationary shift rail 50 of the first embodiment or the sliding shift rail 350 of the third embodiment.

It will also be appreciated that typically two of the single shift rail assemblies disclosed and claimed herein will be utilized with any given transmission. This configuration represents a reduction in at least one and possibly two shift rails as well as a reduction in the number of mounting features necessarily required to support such shift rails.

The description of the invention is merely exemplary in nature and variations that do not depart from the gist of the invention are intended to be within the scope of the invention. Such variations are not to be regarded as a departure from the spirit and scope of the invention.

What is claimed is:

1. A single rail shift assembly for a transmission comprising, in combination,
 a pair of synchronizer clutches,
 a single, stationary shift rail,
 a pair of shift fork assemblies disposed for independent translation on said single, stationary shift rail, each of said shift fork assemblies including a yoke for engaging a respective one of said synchronizer clutches and ball bearing assemblies disposed between said shift fork assemblies and said single, stationary shift rail,
 a pair of detenting assemblies associated with a respective one of said shift fork assemblies for resisting motion of said shift fork assemblies, each of said pair of detenting assemblies including a plurality of detenting recesses, a detent ball and means for biasing said detent ball toward said recesses, and a pair of multiple position actuators for translating a respective one of said pair of shift fork assemblies on said single, stationary shift rail.

2. The single rail shift assembly of claim 1 wherein said transmission is one of a manual or dual clutch transmission.

3. The single rail shift assembly of claim 1 wherein said plurality of detenting recesses of said detenting assemblies are disposed on said shift rail and said detent balls and biasing means of said detenting assemblies are disposed on said shift fork assemblies.

4. The single rail shift assembly of claim 1 wherein said detenting recesses of said detenting assemblies are disposed on an exterior of said shift fork assemblies and said detent balls and biasing means of said detenting assemblies are mounted on a housing.

5. The single rail shift assembly of claim 1 wherein a first plurality of said detenting recesses are disposed on said single shift rail and a second plurality of said detenting recesses are disposed on an exterior of one of said shift fork assemblies.

6. A shift assembly for a motor vehicle transmission comprising, in combination,
   a housing,
   a countershaft rotatably disposed in said housing,
   a pair of synchronizer clutches disposed on said countershaft,
   a single, stationary shift rail mounted in said housing and disposed parallel to said countershaft,
   a pair of shift fork assemblies disposed for independent translation on said stationary shift rail, each of said shift fork assemblies including a yoke for engaging a respective one of said synchronizer clutches and at least one bearing for slidably engaging said stationary shaft,
   a pair of detenting assemblies cooperating with a respective one of said shift fork assemblies for resisting motion of each of said pair of shift fork assemblies, each of said pair of detenting assemblies including a plurality of detenting recesses, a detent ball and means for biasing said detent ball toward said recesses, and
   a pair of multiple position actuators for translating a respective one of said pair of shift fork assemblies.

7. The shift assembly of claim 6 wherein said motor vehicle transmission is one of a manual or dual clutch transmission.

8. The shift assembly of claim 6 wherein said at least one bearing includes a pair of linear bearing assemblies for supporting said shift rail.

9. The shift assembly of claim 6 wherein said plurality of detenting recesses of said detenting assemblies are disposed on said shift rail and said detent balls and biasing means of said detenting assemblies are disposed on said shift fork assemblies.

10. The shift assembly of claim 6 wherein said detenting recesses of said detenting assemblies are disposed on an exterior of said shift fork assemblies and said detent balls and biasing means of said detenting assemblies are mounted on a housing.

11. The shift assembly of claim 6 wherein a first plurality of said detenting recesses are disposed on said shift rail and a second plurality of said detenting recesses are disposed on an exterior of one of said shift fork assemblies.

12. A single rail shift assembly for a motor vehicle transmission comprising, in combination,
   a pair of synchronizer clutches disposed on a countershaft,
   a single, stationary shift rail,
   a pair of shift fork assemblies disposed for independent, bi-directional translation on said single, stationary shift rail, each of said shift fork assemblies including a body, a yoke for engaging a respective one of said synchronizer clutches and bearings for slidably receiving said single, stationary shift rail,
   a pair of detenting assemblies associated with a respective one of said shift fork assemblies for resisting motion of each of said pair of shift fork assemblies, each of said pair of detenting assemblies including a plurality of detenting recesses, a detent ball and means for biasing said detent ball toward said recesses, and
   a pair of multiple position actuators for translating a respective one of said pair of shift fork assemblies on said single, stationary shift rail.

13. The single rail shift assembly of claim 12 wherein said plurality of detenting recesses of said detenting assemblies are disposed on said single shift rail and said detent balls and biasing means of said detenting assemblies are disposed on said bodies of said shift fork assemblies.

14. The single rail shift assembly of claim 12 wherein said plurality of detenting recesses of said detenting assemblies are disposed on an exterior of said bodies of said shift fork assemblies and said detent balls and biasing means of said detenting assemblies are mounted on a housing.

15. The single rail shift assembly of claim 12 wherein a first plurality of said detenting recesses are disposed on said single shift rail and a second plurality of said detenting recesses are disposed on an exterior of one of said bodies of said shift fork assemblies.

16. The single rail shift assembly of claim 12 wherein said bearings include ball bearing assemblies operably disposed between said shift fork assemblies and said single shift rail.

* * * * *